United States Patent [19]

Dray et al.

[11] Patent Number: 5,071,255

[45] Date of Patent: Dec. 10, 1991

[54] APPARATUS FOR VARYING PRESSURE WITHIN A SCREW CHANNEL

[76] Inventors: Robert F. Dray, R.D. #1, Box 273M, Hamilton, Tex. 76531; Bryan C. Bennett, 1903 Westover Dr., Arlington, Tex. 76016

[21] Appl. No.: 565,158

[22] Filed: Aug. 2, 1990

[51] Int. Cl.⁵ .............................................. B29B 1/06
[52] U.S. Cl. ..................................... 366/81; 366/319; 425/207
[58] Field of Search ....................... 366/79, 80, 81, 82, 366/87, 90, 84, 83, 324, 319; 425/207, 208, 192 R, 149

[56] References Cited

U.S. PATENT DOCUMENTS

| | | | |
|---|---|---|---|
| 4,444,507 | 4/1984 | Dray | 366/81 |
| 4,491,417 | 1/1985 | Hold | 366/75 |
| 4,723,847 | 2/1988 | Dray | 366/319 |

*Primary Examiner*—Robert W. Jenkins
*Attorney, Agent, or Firm*—Gamble, Mojock, Piccione, Palmer & Green

[57] ABSTRACT

An improved apparatus for varying the pressure within a screw channel which apparatus includes a shaft having a helical flight defining a channel between consecutive turns of the flight. The screw is rotatable within a barrel. A radially movable first member is disposed at a right angle to a longitudinal axis of the screw where the plasticated material has undergone partial melting. A reciprocatively movable second member is disposed within a bore through the shaft coaxial with the axis and includes a cam slidably engaged with an inner end of the first member such that the first member can be extended into the screw channel when the second member is moved in one direction and retracted from the channel when the second member is moved in another direction. At an upstream end of the second member there is provided a rotatable thrust transmitting coupling which allows rotation of the second member relative to a male threaded portion secured to the coupling and coaxial with the second member. The male threaded portion is engageable with a fixed female threaded portion. An adjusting flat is provided on the male threaded portion. There is also provided apparatus for automatically maintaining a predetermined pressure or temperature in a screw channel.

6 Claims, 3 Drawing Sheets

APPARATUS FOR VARYING PRESSURE WITHIN A SCREW CHANNEL

This invention relates to an improved apparatus for varying the pressure within a screw channel of the type in which a movable dam or barrier is extendable or retractable into or from a screw channel. The apparatus includes a shaft having a helical flight thereabout which defines a helical channel between consecutive turns of the flight. The shaft and the flight are rotatable within a barrel which has a circular bore therethrough. At least one radially movable first member is disposed at a right angle to a longitudinal axis of the screw at a location along the screw channel where the plasticated material has undergone partial melting. A reciprocatively movable second member is disposed within a cylindrical bore through the shaft coaxial with the axis of rotation. The second member includes at its downstream end a cam means slidably engaged with an inner end of the first member such that the first member can be extended into the screw channel when the second member is moved in one direction and retracted from the channel when the second member is moved in another direction. At an upstream end of the second member there is provided a rotatable thrust transmitting coupling which is able to allow rotation of the second member relative to a male threaded portion secured to the coupling coaxial with the second member. The male threaded portion is engageable with a female threaded portion which is fixed relative to the screw. An adjusting flat or nut is provided on an end of the male threaded portion to allow turning of the male threaded portion, thereby advancing or retracting it and the second member into and from the bore of the shaft. The upstream and downstream movements of the second member is translated by the cam means into radially inward and outward movement of the first member which decreases or increases pressure in an upstream direction within the screw channel. Because the second member is able to rotate with respect to the adjustable male threaded portion, adjustments to the first member can be made while the screw is turning within the barrel since the male threaded portion and its adjusting nut or flat remains stationary. There is also provided a means for automatically maintaining a predetermined pressure or temperature in a screw channel.

As described in an earlier patent issued to Robert F. Dray, U.S. Pat. No. 4,723,847, it is believed to be advantageous to be able to continuously vary the pressure within a screw channel to accommodate different material characteristics. This particular patent provided an apparatus for advancing or retracting a movable dam into and from a screw channel thereby increasing or decreasing the pressure within the channel without removing the screw from the barrel of the machine. A disadvantage of this arrangement is that the screw's rotation must be stopped while the adjustment was made because the adjusting portion of that apparatus rotated with the screw. While the screw is stopped within the barrel, there is a risk of degradation of the plasticated material.

Another disadvantage of this earlier apparatus that the dam or barrier relied on pressure existing within the screw channel to force it back into its opening from the channel of the screw when the first member was retracted. This required close tolerances in the machining of the dam or barrier and the opening into which it fit. In addition, there existed a risk that plasticated material might enter the gap between the opening and the barrier and cause erratic operation.

The invention to be described more fully hereinafter remedies the shortcomings of my earlier apparatus and in addition, provides features and advantages not appearing therein nor in the prior art.

It is therefore, a primary object of this invention to provide apparatus for continuously varying the pressure within a screw channel while the screw is rotating and without the necessity of stopping its rotation.

Another object of the invention is to provide a positive retraction of the barrier or dam from the screw channel rather than relying on hydraulic pressure within the channel to force it back against its corresponding first member.

Still another object of the invention is to provide a plurality of such barriers which are able to extend or retract in a predetermined sequence so as to accommodate different materials.

SUMMARY OF THE INVENTION

In the fulfillment of the foregoing objects, the present invention provides an improved plasticating apparatus for continuously varying the pressure within a screw channel while the plasticating apparatus is operating. A feed screw, which includes a cylindrical shaft and a helical channel formed thereabout between consecutive turns of a helical flight rotates with a cylindrical barrel about a longitudinal axis, and melts and conveys plasticated material in a downstream direction. A radially movable first member acts as a barrier or dam which extends across the channel parallel to the longitudinal axis of the screw at a location along the channel where the material is partially melted. It is disposed within an opening in the channel extending from the channel into a bore through the shaft which is concentric with the longitudinal axis of the screw. A reciprocatively movable second member is disposed within the bore coaxial with the longitudinal axis. The second member has cam means which includes a second inclined surface which is inclined at an acute angle relative to the longitudinal axis of the screw and is matable with a corresponding parallel first inclined surface on an inner end of the first member. The two inclined surfaces provide a linear cam action to extend the first member through the opening into the channel when the second member is advanced into the bore in a downstream direction. The inclined surface of the first member is further provided with a key-like extension which slidably interlocks with a mating keyway formed in the first member such that the first inclined surface and its keyway and the second inclined surface and its key are parallel. The first inclined surface of the first member is continually held in slidable engagement with the second inclined surface of the second member by the key and its interlocking keyway to positively retract the first member.

The upstream end of the second member is coaxially secured to a rotatable thrust and tension transmitting coupling to which is also coaxially secured a male threaded member disposed along the longitudinal axis such that the coupling is between the second member and the male threaded member. The thrust coupling is able to transmit both compressive and tensile forces while allowing the second member and the male threaded member to rotate relative to each other. The male threaded member is threadably engaged with a female threaded member secured to a non-moving portion of the plasticating machine such as the machine's gear box housing so that the female threaded member does not rotate or move relative to the male threaded member. An adjusting flat or nut is provided on the end of the male threaded member so that as the nut is turned, the male threaded member engages the threads of the female threaded member and advances downstream or retracts upstream while the second member rotates with the screw and advances or retracts into or from the bore. The first member, which is always slidably interlocked with the second member, extends into the channel or retracts therefrom in response to the turning of the nut or flat. As shown in the preferred embodiment, if the first member extends into the channel, it produces a pressure rise in an upstream direction and conversely, as the first member is retracted from the channel, it results in a reduction in the pressure in the channel. A plurality of these devices may be formed on the second member in tandem so as to sequentially operate a plurality of barriers or dams.

DESCRIPTION OF THE DRAWINGS

Other objects and advantages of the present invention will be apparent from the ensuing description in the illustrative embodiment thereof and the course of which reference is made to the accompanying drawings and which.

DESCRIPTION OF THE PREFERRED EMBODIMENT

Figure 1:
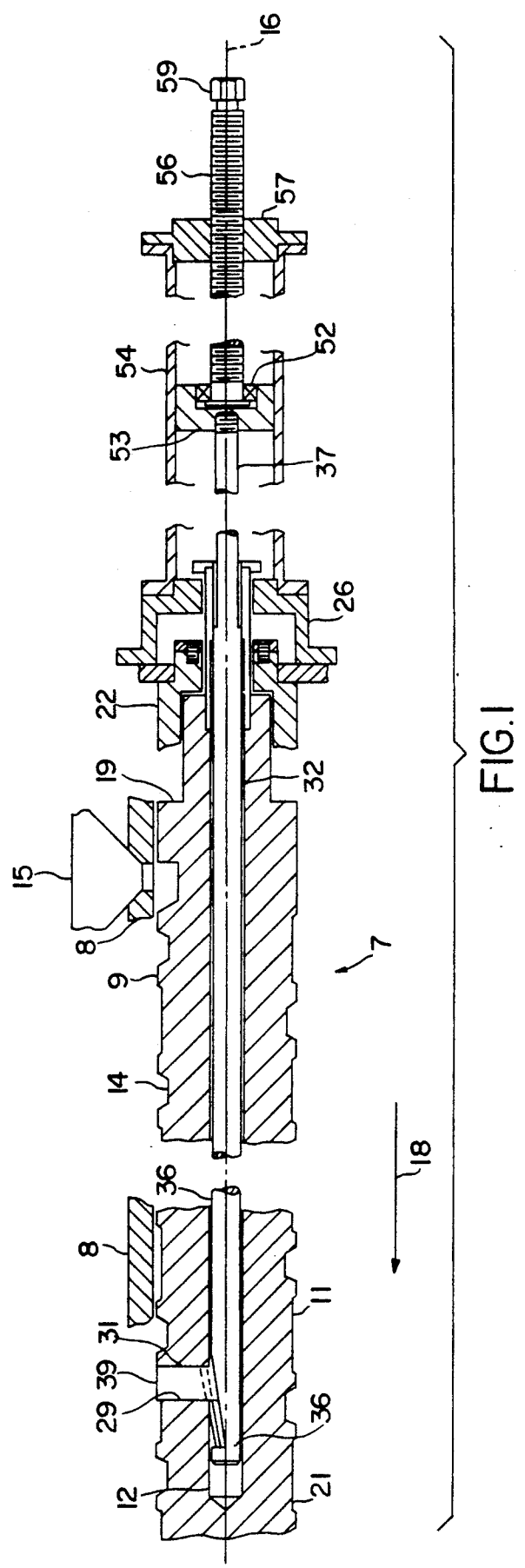
FIG. 1 is an elevational view of a plasticating screw embodying the invention. For purposes of illustration, the screw's first member is shown as inserted into its opening and engaged with its corresponding second surface.

Reference is now made to FIG. 1 of the drawings in which a plasticizing feed screw which embodies the invention is generally indicated by reference numeral 7. Screw 7 includes a helical flight 9 which is integrally formed about shaft 11. There is defined between consecutive turns of helical flight 9 a helical channel 14 in which plasticated material introduced into channel 14 through a hopper 15 is conveyed in a downstream direction identified by reference numeral 18 as screw 7 rotates around its longitudinal axis 16 within a barrel 8, a portion of which is shown in section. The plasticated material is melted and conveyed in a downstream direction from the shank end 19 of the screw 7 to the nose end 21 of screw 7. Screw 7 has a bore 12 disposed coaxially with longitudinal axis 16 from shank end 19 to the vicinity of nose end 21. Drive sleeve 22 fits over the shank end 19 of the screw 7 and is rotatably coupled to a drive mechanism, which for purposes of clarity, is not shown. Drive sleeve 22 rotates within gearbox housing 26 while gearbox housing 26 remains stationary.

Figure 2:
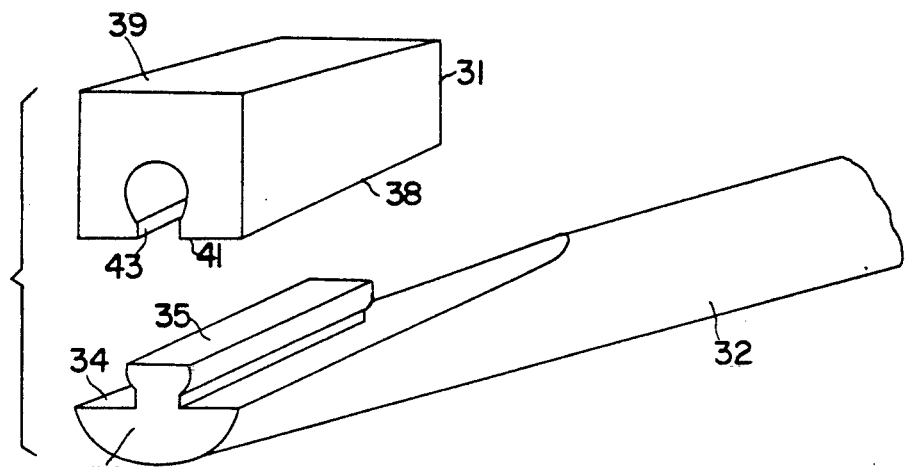
FIG. 2 is an isometric exploded detail of a first member and a second member and their respective keyway and key.

Referring now to FIG. 2 in conjunction to FIG. 1, screw 7 is provided with an elongated opening 29 which extends from a bore 12 into channel 14. Opening 29 is oriented parallel to longitudinal axis 16 and is located at a point along channel 14 at which the plasticated material has begun to melt so that channel 14 will contain partially melted material. First member 31 is slidably disposed within opening 29 so that it may slide in a radial direction with respect to longitudinal axis 16. First member 31 has an inner end 38 which extends into bore 12, and an outer end 39 which extends into channel 14. Inner end 38 is provided with first surface 41 which is inclined at an acute angle with respect to longitudinal axis 16. First surface 41 is also provided with a keyway 43 which is shown in FIG. 2 as being approximately circular in cross section and disposed parallel with first surface 41, in a co-planar orientation with longitudinal axis 16. Although keyway 43 is depicted as being approximately circular in cross section, it should be understood that keyway 43 could include, for example, a triangular cross-section or any other cross-section, having a width which increases with its depth in inner end 38.

Still referring to FIG. 1 and FIG. 2, there is also disposed within bore 12 a second member 32 which is circular in cross section. Second member 32 is slidable within bore 12 and is provided with a second surface 34 which is disposed relative to longitudinal axis 16 at the same acute angle as first surface 41 of first member 31 so as to be parallel with first surface 41. Second surface 34 of second member 32 has a downstream end 36 and an upstream end 37, upstream end 37 extending outwardly from shank end 19 of screw 7. Downstream end 36 of second member 32 is located in the vicinity of opening 29 and is provided with a key 35, which in FIG. 2 is shown to likewise have an approximate semi-circular cross section so as to be matable with keyway 43, although key 35 may also have any configuration which provides a slidable interlock with keyway 43. Key 35 is parallel with second surface 34, so that key 35 and second surface 34 are held in a slidably interlocking relationship with keyway 43 and first surface 41 of first member 31. First surface 41 of first member 31 and second face 34 of second member 32 may be seen to be slidably engageable with each other and function as a linear cam. First surface 41 of first member 31 can slide along second surface 34 of second member 32, but first member 31 and second member 32 will remain slidably engaged with each other due to the interlocking relation between key 35 and keyway 43. This slidable interlocking relationship enables first member 31 to be positively retracted through opening 29 from channel 14. The cam action provided by key 35 and keyway 43, and also by first surface 41 and second surface 34, causes first member 31 to be extended or retracted into or from channel 14 through opening 29 in response to a corresponding extension or retraction of second member 32 into or from bore 12.

It should be obvious to those skilled in the art that the acute angle of first surface 41 and second surface 34 could be reversed to provide an opposite action so that, for example, first member 31 would extend into channel 14 in response to a withdrawal of second member 31 from bore 12. This would cause no differences in the operation of the invention.

Figure 3:
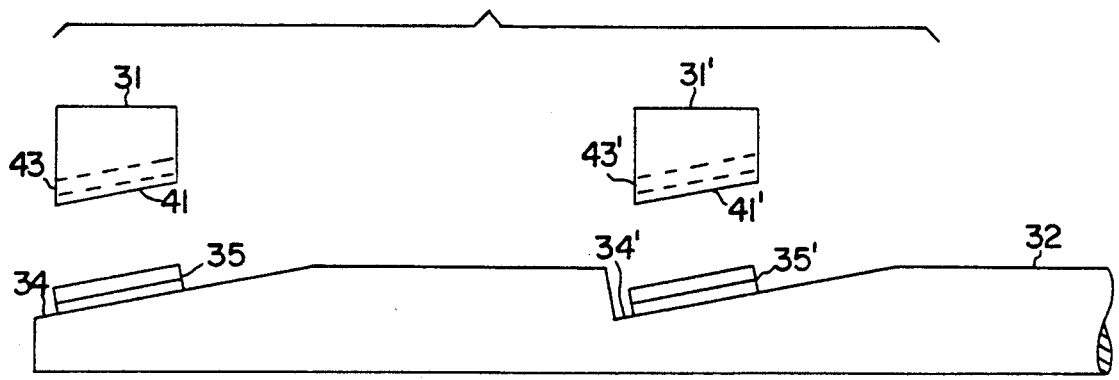
FIG. 3 is an elevational view of a series of first members and corresponding second surfaces formed in tandem on a second member.
Figure 4:
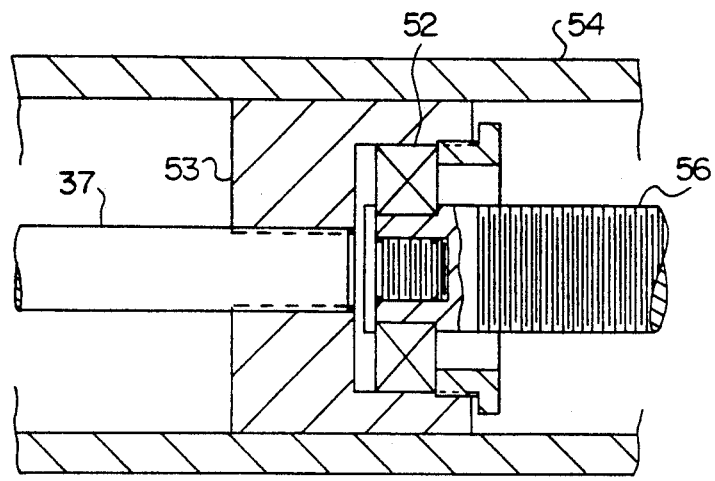
FIG. 4 is a detail view of a thrust and tensile force transmitting coupling rotatably secured between a second member and a male threaded member.

Referring now to FIG. 1 in conjunction with FIG. 4, upstream end 37 of second member 32 is secured to a thrust and tensile force transmitting coupling 52. Also connected to coupling 52 so as to be coaxial with second member 32 is a male threaded member 56. Coupling 52 is situated between second member 32 and male threaded member 56 and is able to transmit either a compressive or a tensile force along axis 16 while permitting male threaded member 56 and second member 32 to rotate relative to one another. Coupling 52 is shown in the preferred embodiment in FIGS. 1 and 3 to be a double row thrust bearing. Coupling 52 is held in a carrier 53 which is slidably contained in cylinder 54 to assure that second member 32, coupling 52 and male threaded member 56 are concentric and coaxial with longitudinal axis 16. Cylinder 54 is stationary and is illustrated as being secured to gearbox housing 26. Those skilled in the art will recognize that other devices exist which could be substituted for the double row thrust bearing shown to transmit forces along longitudinal axis 16 to second member 32 and yet permit the relative rotation of second member 32 and male threaded member 56. The threads of male threaded member 56 are engaged with matching threads of a female threaded member 57 which is immovable and may be secured to cylinder 54 or another fixed part of the plasticating machine. In addition, male threaded member 56 is provided with an adjusting flat or nut 59 which allows male threaded member 56 to be rotated within female threaded member 57 such that when male threaded member 56 is turned, male threaded member 56 and second member 32 by way of coupling 52, are able to advance or retract within bore 12 while second member 32 rotates with screw 7.

As may be seen in FIG. 3 of the drawings, a plurality of first members 31 and corresponding second surfaces 34 and keys 35 disposed in tandem along longitudinal axis 16 may be used to provide a sequential movement of a plurality of first members 31. The locations of each first member 31 with its first surface 41 and keyway 43 is selected relative to its corresponding second surface 34 and key 35 to produce the desired sequence of movement of each first member 31 corresponding to an inward and outward movement of second member 32.

Figure 5:
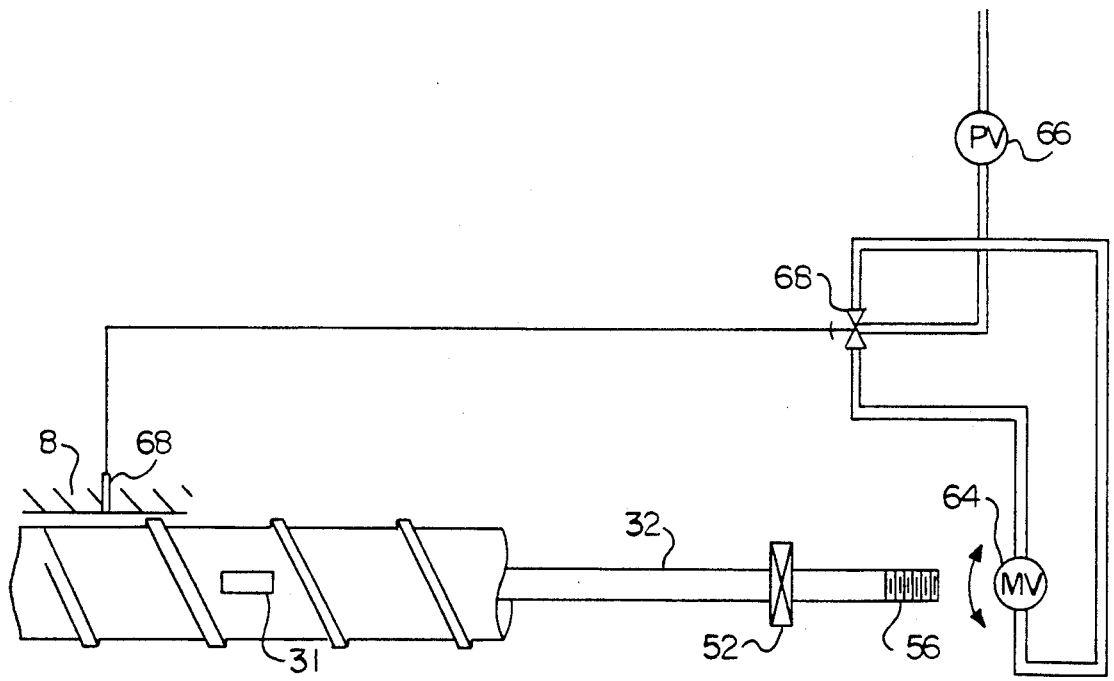
FIG. 5 is a drawing in semi-schematic form of a hydraulic system for automatically maintaining a predetermined pressure or temperature in a screw channel.

Referring to FIG. 5, there is shown a portion of the apparatus previously described except that in place of adjusting nut 59, there is shown in schematic form a hydraulic feed-back loop to automatically maintain a pre-set pressure or temperature in channel 14. Hydraulic motor 64 is rotatably secured to second member 32, and is powered by hydraulic pump 66. Transducer 68 is selected so as to measure either temperature or pressure in channel 14 and extends through barrel 8 into channel 14 at a predetermined location near nose end 21 of screw 7. Transducer 68 controls a flow of hydraulic fluid to hydraulic motor 64 through a suitable microprocessor or other controlling network which is continuously responsive to transducer 68 as is known to those skilled in the art. If, for example, transducer 68 encounters a rising pressure in channel 14 it would cause a hydraulic fluid flow to motor 64 which then rotates male threaded member 56 in a direction so as to withdraw second member 32 from bore 12 retracting first member 31 from channel 14. This would produce a lower pressure in channel 14. Conversely, if transducer 68 encounters a lowering pressure in channel 14, it causes a reverse flow of hydraulic fluid to motor 64 so as to rotate male threaded portion 56 in an opposite direction and cause second member 32 to advance into bore 12 and forcing first member 31 into channel 14. This increases the pressure in channel 14.

Those skilled in the art will note that a hydraulic cylinder and pump combination or an electric motor and appropriate power system and control network might also be secured to male threaded member 56 and be made responsive to transducer 68 to accomplish a similar function.

OPERATION

In operation, while the screw 7 is rotating within barrel 8 of the plasticating apparatus adjusting nut 59 may be turned by using a suitable tool or by using an automated operator such as a hydraulic cylinder or an electric motor as described above to turn male threaded member 56. Depending on the direction in where male threaded member 56 is turned, it advances or retracts within bore 12 due to its engagement with female threaded member 57. As may be seen in the preferred embodiment, as second member 32 advances in a downstream direction in bore 12, second surface 34 of second member 32 bears against its corresponding first surface 41 of first member 31 and forces first member 31 and its outer end 39 into helical channel 14. This presents a barrier or restriction across channel 14 which produces a pressure increase in an upstream direction in channel 14. Conversely, if adjusting nut 59 is rotated in an opposite direction, male threaded member 56 will retract from bore 12 so that second member 32 also retracts from channel 14. Because key 35 is slidably interlocked with keyway 43 and both are disposed at an acute angle with respect to longitudinal axis 16, as second member 32 is withdrawn from bore 12, first member 31 is also positively retracted through opening 29 from channel 14. This causes a reduction of pressure within the upstream portion of channel 14. Because coupling 52 is able to transmit compressive or intensile forces while permitting the relative rotation of male threaded member 56 and second member 32, second member 32 is able to rotate with screw 7 so that first member 31 and second member 32 may remain slidably engaged with each other due to the interlocking relationship of key 35 and keyway 43 while male threaded member 56 does not rotate.

Thus it may be seen that due to the slidable interlocking relationship between first surface 41 and second surface 34, when second member 32 is retracted from bore 12, either manually or automatically, as described above, it is able to positively retract first member 31 and its outer end 39 from channel 14 through opening 29 rather than relying on hydraulic pressure within channel 14 to force first member into opening 29.

A system for automatically moving second member 32 and first member 31 to maintain a predetermined pressure has been previously described. If this embodiment is used, second member 32 and first member 31 will be automatically operated so as to maintain such an extension of first member 31 into channel 14 so as to maintain the pressure or temperature in channel 14 at a predetermined setting.

As was noted above a series of first members 31 and their corresponding inclined face portions of a second member 32 can be placed along channel 14. Depending on the relative orientation of each inclined face portion 41 of each first member 31 with regard to its corresponding inclined face portion 34 of second member 32, these first members may be operated simultaneously with a movement of second member 32 or may be operated sequentially with such a movement so that as second member 32 advances or retracts in bore 12, it will cause a group or plurality of first members 31 to advance or retract into channel 14 in a predetermined sequence.

Thus, it may be seen from the foregoing description that apparatus has been provided to vary pressure within a screw channel while the screw is in operation and rotating. In addition, a barrier or dam is provided which can be positively retracted from the screw channel eliminating the need to rely on hydraulic pressure of the plasticated material to force the barrier back into its opening. Finally, it is possible to arrange a series of dams or barriers which may be sequentially or simultaneously operated on the relative orientation of the inclined faces of each first member in the corresponding inclined faces of the second member.

Although but one embodiment of the present invention has been illustrated and described, it should be apparent to those skilled in the art that various changes and modifications can be made to these embodiments without departing from the spirit and the scope of the invention.

I claim:

1. Apparatus for melting and conveying plasticated material comprising:
   (a) a barrel having a longitudinal axis;
   (b) a shaft rotatable within said barrel and having a substantially circular cross-section, said shaft further having a cylindrical bore therethrough, said shaft and said bore being concentric with said axis;
   (c) at least one helical channel defined between successive turns of at least one helical flight formed integrally on said shaft, said channel further having at least one opening extending in a radial direction from said bore into said channel at a predetermined location along said channel;
   (d) a radially movable first member slidably disposed within said opening, said first member further having an outer end extendable into said channel and inner end extending into said bore;
   (e) a reciprocatively movable second member slidably disposed within said bore, said second member having a cam means at a downstream end thereof slidably engaged with said inner end of said first member for extending and retracting said outer end of said first member from and into said channel in response to said reciprocating movement of said second member, and
   (f) an adjusting means rotatably secured to said second member at its upstream end for reciprocatively moving said second member a predetermined distance along said longitudinal axis while allowing relative rotation between said second member and said adjusting means.

2. The apparatus of claim 1 wherein said adjusting means includes a male threaded member threadably engaged with a female threaded portion fixedly secured relative to said male threaded member, said male threaded member being disposed coaxially with said axis and said second member, said adjusting means further including a rotatable thrust and tension transmitting coupling coaxially secured between said second member and said male threaded member such that said second member and its cam means are able to rotate with said shaft relative to said male threaded member, whereby said cam means can be reciprocatively moved in an upstream or downstream direction within said bore of said shaft causing said first member to be retracted from or extended into said channel by a predetermined distance when said male threaded member is rotated through a corresponding angle.

3. The apparatus of claim 2 wherein said cam means includes a first inclined surface formed on said inner end of said first member, and a second inclined surface formed on said second member, said second inclined surface including a key means slideably interlocked with a corresponding keyway means formed on said first inclined surface.

4. The apparatus of claim 1 wherein said second member is provided with a plurality said cam means arranged in tandem, and shaft is provided with a plurality of first members and openings located at predetermined distances along said shaft for cooperation with their corresponding cam means such that a rotation of said male threaded member and a corresponding advancing or retraction of said second member within said bore will extend or retract said first members in a predetermined sequence.

5. The apparatus of claim 1 wherein said adjusting means further includes a pressure or temperature sensing means communicating with said channel downstream from said opening for measuring the pressure or temperature of the material therein, and a reversible drive means responsive to said sensing means for extending or withdrawing said second member into or from said bore in response to changes in the pressure or temperature in said channel.

6. Apparatus for melting and conveying plasticated material comprising:
   (a) a barrel having a longitudinal axis;
   (b) a shaft rotatable within said barrel and having a substantially circular cross-section, said shaft further having a cylindrical bore therethrough, said shaft and said bore being concentric with said axis;
   (c) at least one helical channel defined between successive turns of at least one helical flight formed integrally on said shaft, said channel further having an opening extending in a radial direction from said bore into said channel at a predetermined location along said channel;
   (d) a radially movable first member slidably disposed within said opening, said first member further having an outer end extendable into said channel and inner end extending into said bore, said inner end having a first inclined surface and a key formed thereon;
   (e) a reciprocatively movable second member slidably disposed within said bore, said second member having at a downstream end thereof a second inclined surface parallel to said first inclined surface and a keyway slidably engageable with said key of said first member;
   (f) a male threaded member disposed coaxially with said axis and said second member;
   (g) a female threaded portion threadably engaged with said male threaded member and fixedly secured relative thereto; and
   (h) a rotatable thrust and tension transmitting coupling secured between said second member and said male threaded member whereby said second member can rotate with said shaft relative to said male threaded member and can be reciprocatively moved in an upstream or downstream direction within said bore of said shaft causing said first member to be retracted from or extended into said channel by a predetermined distance when said male threaded member is rotated through a corresponding angle.

* * * * *